(No Model.) 2 Sheets—Sheet 2.
A. G. JOHNSON.
RUNNING GEAR FOR VEHICLES.
No. 319,821. Patented June 9, 1885.
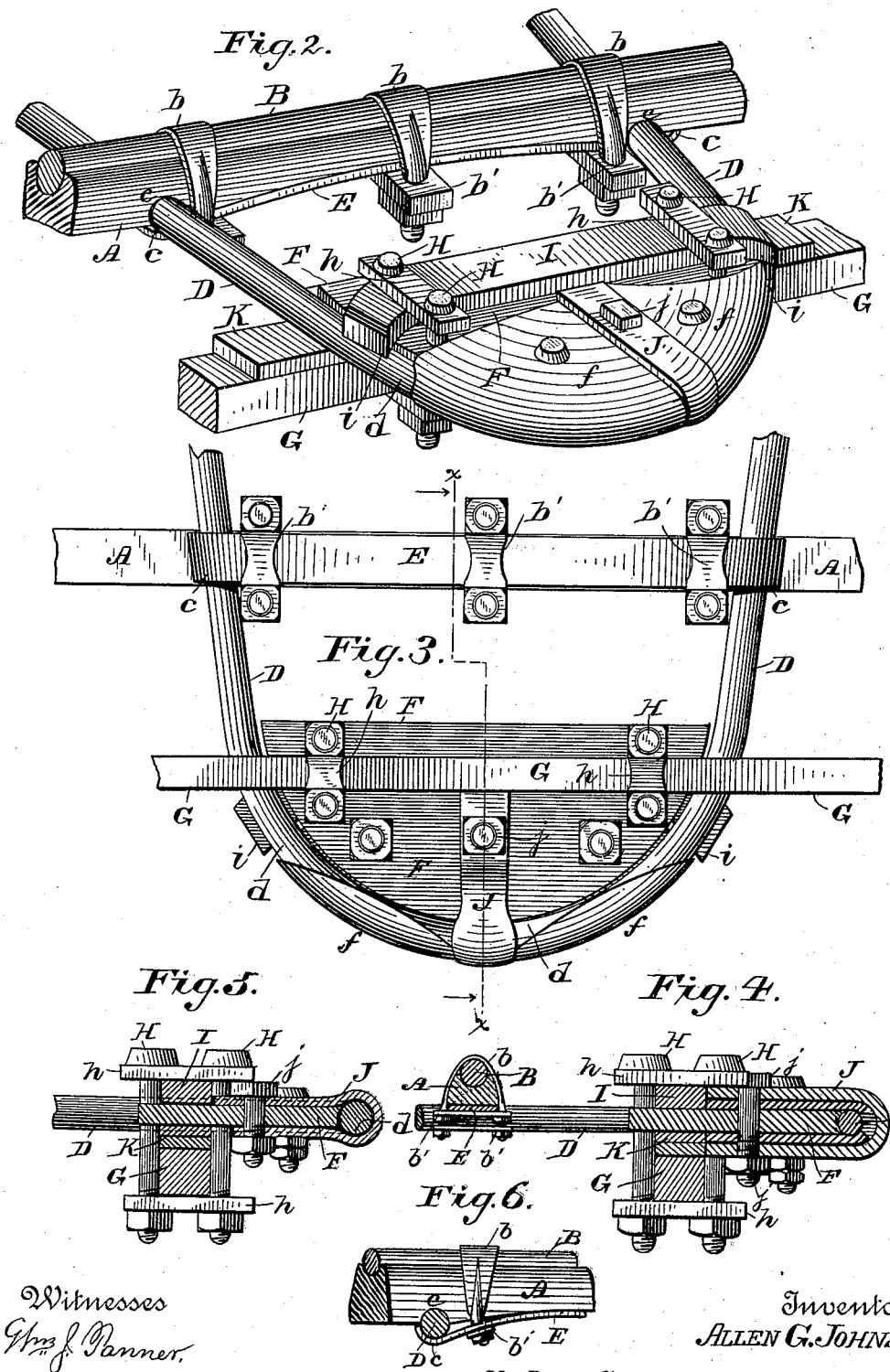
Witnesses
Wm. J. Danner,
H. W. Elmore.
Inventor
ALLEN G. JOHNSON
By his Attorneys
Johnson and Johnson
N. PETERS, Photo-Lithographer, Washington, D. C.

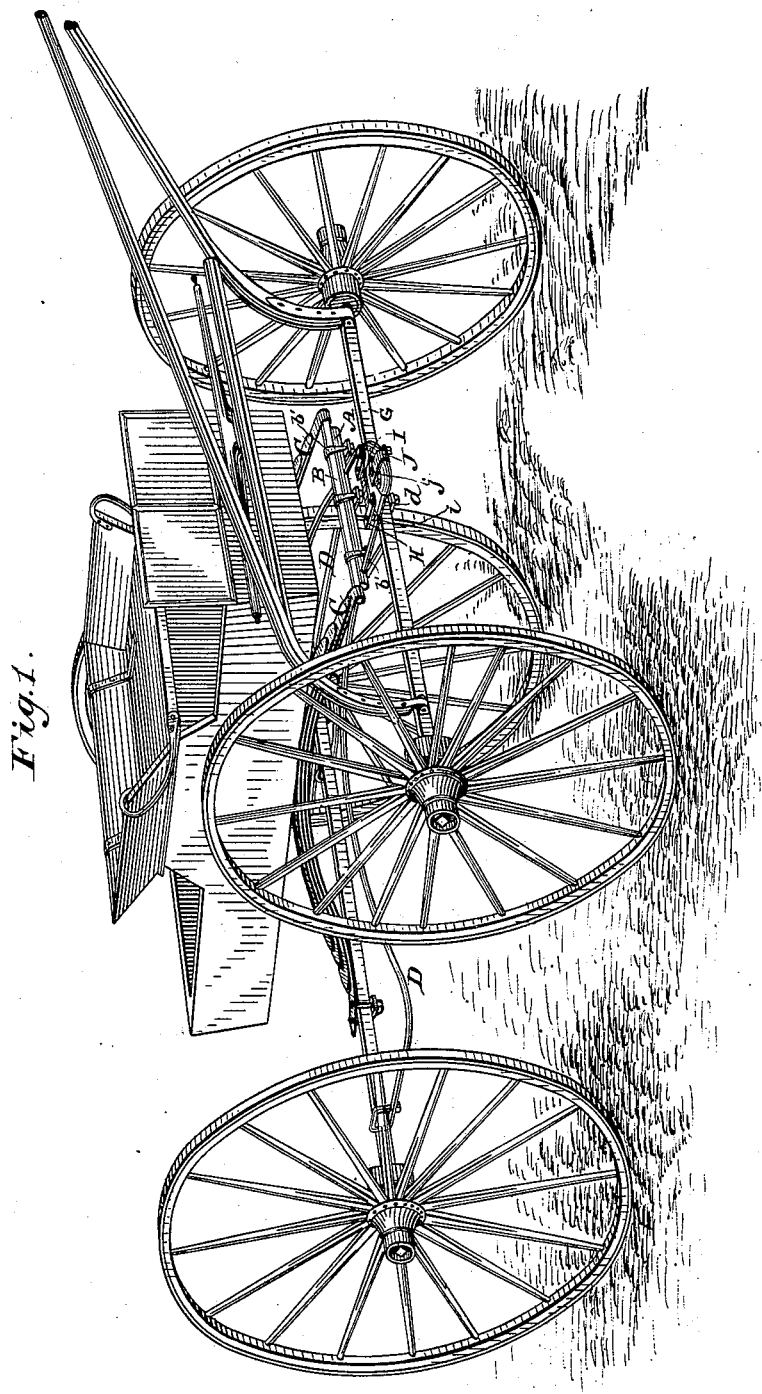

UNITED STATES PATENT OFFICE.

ALLEN GEORGE JOHNSON, OF QUITMAN, GEORGIA.

RUNNING-GEAR FOR VEHICLES.

SPECIFICATION forming part of Letters Patent No. 319,821, dated June 9, 1885.

Application filed April 29, 1885. (No model.)

*To all whom it may concern:*

Be it known that I, ALLEN GEORGE JOHNSON, a citizen of the United States, residing at Quitman, in the county of Brooks and State of Georgia, have invented new and useful Improvements in Running-Gear for Vehicles, of which the following is a specification.

This invention relates to an improvement in running-gear for vehicles; and the improvement consists in the peculiar construction, arrangement, and combination of parts, as more fully hereinafter set forth and claimed.

Figure 1 represents a perspective view of a vehicle with my improvement attached; Fig. 2, a similar view of the particular improvement. Fig. 3 is a bottom view of a portion of the running-gear or fifth-wheel device. Fig. 4 is a section on the line $x\ x$ of Fig. 3. Fig. 5 is a slight modification of the same; Fig. 6, a detail.

The object of the invention is to improve that class of running-gear in which the reaches are made of one piece or bar, curved at the front, and at the same time made to perform the function of a fifth-wheel and king-bolt.

The head-block A supports, by any of the well-known means, the forward part of a vehicle-body. In the present instance the head-block supports the forward ends of the side springs, and is shown grooved on its upper side to receive a metal bar, B, held in place by clips $b$ to the extremities of said head-block bar B. The side springs, C, are attached as in Fig. 1.

The reaches D, formed of a single bar bent or returned on itself, are secured to the under side of the head-block by a plate, E, held in place by the cross-bar $b'$ of the clips $b$. To prevent any lateral displacement or spreading of the reaches, they are seated in notches $c$, formed within the head-blocks, and the ends of the plate E are bent to partially embrace the reach-bars. The forward end or returning portion $d$ of the reaches is formed on the arc of a circle and passes around a segmental plate, F, secured to the front axle, G, of a vehicle by bolts H, arranged in pairs, one bolt of each pair passing on either side of the axle and joined by cross-ties $h$.

The plate F is grooved or flanged to correspond with the end $d$ of the reach, which is preferably circular in cross-section.

A bar or plate, I, secured to the top of the plate F by the bolts H, has its ends $i$ curved forward and extending over the curved end of the reaches, to assist in keeping the latter in place.

As a means to keep the plate F and end $d$ of the reaches in contact and prevent any longitudinal play between the same, plates or straps $f$ are secured to the plate F, and are bent over and particularly around said curved end of the reaches, and are used either in connection with or without a plate-bar, J, bent to embrace the upper and lower sides of the plate F, and held thereto by a bolt, $j$. Bars K may be interposed between the axle G and plate F to re-enforce the axle, and also to take the wear of the reaches from the axle.

The clamping of the head-blocks upon the reach-arms in rear of the axle provides a means for mounting the springs or the body directly upon a reach-arm, which forms a part of the fifth-wheel device, and gives a durable and safe construction without the use of a king-bolt. The reach-arms are supported free of the axle by the bar K, and in connection with the latter the top bar, I, confines the reach-arms upon the axle.

This construction, in connection with the clamping of the reach-arms to the cross-head in rear of the front axle, braces and supports fifth-wheel device by bracing and supporting the curved end of the reach-bar from spreading or from twisting, and thereby allows the front axle to turn freely upon the curved end of the reach.

Separate plates and lap-bars J may be used, as in Fig. 4, to form the fifth-wheel seat.

I claim—

1. In combination with the front axle of a vehicle, having a segmental plate secured thereto, of a reach attached to and extending beyond the head-block and having its end conform to the curvature of the plate, and a strap or straps, substantially as described, attached to the plate and bent over the curved end of the reach, as and for the purposes set forth.

2. The combination of an axle, a segmental plate attached thereto, a reach extending beyond and curving around said plate and resting on a re-enforcement of the axle, and a bar secured to the upper side of the plate, with its ends passing over the curved end of the reach, substantially as shown, and for the purpose specified.

3. The combination, with a head-block notched on its under side, and a reach seated within said notches, its end curving around a segmental plate on the axle, of a plate-bar secured to the under side of the head-block, with its ends bent to partially embrace the reach, for the purposes described.

4. The combination, with a fifth-wheel device consisting of a curved reach and axle-plate, substantially as hereinbefore set forth, of a head-block bound upon the arms of the reach in rear of the axle and supplemented by a metal bar, to which the body-springs are secured, substantially as specified.

5. The combination, in a vehicle running-gear, of the side springs, and a head-block, consisting of a cross-bar A supplemented by a metal bar, B, and a clamping-plate, E, with a fifth-wheel device consisting of a curved reach, D $d$, and a seat-plate, F, therefor, clamped to the axle, substantially as described, for the purpose specified.

In testimony whereof I have hereunto set my hand in the presence of two subscribing witnesses.

ALLEN GEORGE JOHNSON.

Witnesses:
JACOB BAUM, Jr.,
D. W. ROUNTREE.